United States Patent
Hiltunen et al.

(10) Patent No.: US 7,913,092 B1
(45) Date of Patent: Mar. 22, 2011

(54) SYSTEM AND METHOD FOR ENFORCING APPLICATION SECURITY POLICIES USING AUTHENTICATED SYSTEM CALLS

(75) Inventors: Matti Aarno Hiltunen, Chatham, NJ (US); Mohan Rajagopalan, Mountain View, CA (US); Richard Dale Schlichting, New Providence, NJ (US); Trevor Jim, Princeton, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1358 days.

(21) Appl. No.: 11/321,479

(22) Filed: Dec. 29, 2005

(51) Int. Cl.
*G06F 11/30* (2006.01)
(52) U.S. Cl. .............................. 713/187; 726/1
(58) Field of Classification Search .................. 713/189, 713/187, 165, 167; 726/1, 22, 23, 26; 717/126–133, 717/136–161, 174, 141, 143, 144, 156, 157, 717/159
See application file for complete search history.

(56) References Cited

U.S. PATENT DOCUMENTS

| | | | |
|---|---|---|---|
| 5,485,409 A * | 1/1996 | Gupta et al. | 726/25 |
| 5,909,577 A * | 6/1999 | Devanbu | 717/127 |
| 6,006,328 A * | 12/1999 | Drake | 726/23 |
| 6,381,738 B1 * | 4/2002 | Choi et al. | 717/140 |
| 6,823,460 B1 * | 11/2004 | Hollander et al. | 726/3 |
| 2002/0007456 A1* | 1/2002 | Peinado et al. | 713/164 |
| 2004/0031030 A1* | 2/2004 | Kidder et al. | 717/172 |
| 2004/0139342 A1* | 7/2004 | Aho et al. | 713/200 |
| 2004/0205411 A1* | 10/2004 | Hong et al. | 714/38 |
| 2005/0060568 A1* | 3/2005 | Beresnevichiene et al. | 713/200 |
| 2005/0193428 A1* | 9/2005 | Ring et al. | 726/22 |
| 2005/0246554 A1* | 11/2005 | Batson | 713/194 |
| 2005/0257243 A1* | 11/2005 | Baker | 726/1 |
| 2006/0053492 A1* | 3/2006 | Wallace | 726/26 |
| 2006/0059335 A1* | 3/2006 | Bernardi et al. | 713/164 |
| 2006/0090193 A1* | 4/2006 | Johnson et al. | 726/1 |
| 2006/0101413 A1* | 5/2006 | Kinno et al. | 717/127 |
| 2007/0016914 A1* | 1/2007 | Yeap | 719/328 |

OTHER PUBLICATIONS

Jesus Molina and William Arbaugh, Using Indepentend Auditors as intrusion detection systems, ICICS 2002, Spinrger-verlag Berlin Heidelberg 2002, p. 291-302.*

* cited by examiner

*Primary Examiner* — Matthew B Smithers
*Assistant Examiner* — Abu Sholeman

(57) ABSTRACT

Disclosed is an approach to system call monitoring in which authenticated system calls from an application are easily verified by an operating system kernel. The authenticated system call may be a system call augmented with extra arguments, which specify the policy for that call as well as a cryptographic message authentication code (MAC) that guarantees the integrity of the policy and the system call arguments. This extra information is used by the operating system kernel to verify the system call with little processing overhead. Versions of the applications in which regular system calls have been replaced by authenticated calls are generated automatically by a trusted installer program that reads the application binary, uses static analysis to generate policies, and then rewrites the binary with the authenticated calls. As a result, hacker attacks, malicious software and the like are less likely to be successful in compromising any computers or networks that employ such authenticated system calls.

7 Claims, 7 Drawing Sheets

300

| Program | ASC policy for Linux | ASC policy for OpenBSD | Systrace policy for OpenBSD |
|---|---|---|---|
| bison | 31 | 31 | 24 |
| calc | 54 | 51 | 24 |
| screen | 67 | 63 | 55 |

| System call | ASC | Systrace |
|---|---|---|
| __syscall | yes | NO |
| close | NO | yes |
| fcntl | yes | NO |
| fstatfs | yes | NO |
| getdirentries | yes | NO |
| getpid | yes | NO |
| gettimeofday | yes | NO |
| kill | yes | NO |
| madvise | yes | NO |
| mkdir | NO | yes (fswrite) |
| mmap | NO | yes |

| System call | ASC | Systrace |
|---|---|---|
| nanosleep | yes | NO |
| readlink | NO | yes (fsread) |
| rmdir | NO | yes (fswrite) |
| sendto | yes | NO |
| sigaction | yes | NO |
| socket | yes | NO |
| sysconf | yes | NO |
| uname | yes | NO |
| unlink | NO | yes (fswrite) |
| writev | yes | NO |

| Program Name | Type | Description |
|---|---|---|
| bzip2 | CPU | file compression program from SPEC INT 2000 benchmark. |
| gzip-spec | CPU | file compression program from SPEC INT 2000 benchmark. |
| crafty | CPU | Game playing (Chess) program from SPEC INT 2000 benchmark |
| mcf | CPU | combinatorial optimization program from SPEC INT 2000 |
| vpr | CPU | FPGA circuit and routing placement from SPEC INT 2000 |
| twolf | CPU | Place and route simulator from SPEC INT 2000 |
| gcc | syscall & CPU | Gnu C compiler from SPEC INT 2000 |
| vortex | syscall & CPU | Object oriented database from SPEC INT 2000 |
| pyramid | syscall | Multidimensional database index creation |
| gzip | syscall | file compression program |

| Program | Original | | Authenticated | | |
|---|---|---|---|---|---|
| | Run time (secs) | Std. Dev | Run time (secs) | Std. Dev | Overhead (%) |
| bzip2 | 196.80 | 1.46 | 198.56 | 2.67 | 0.89 |
| gzip-spec | 155.38 | 0.14 | 156.39 | 0.19 | 0.65 |
| crafty | 108.32 | 0.15 | 108.39 | 0.27 | 0.06 |
| mcf | 240.96 | 8.22 | 244.96 | 1.35 | 1.66 |
| vpr | 221.25 | 1.24 | 228.25 | 3.38 | 3.16 |
| twolf | 389.97 | 5.58 | 402.59 | 8.38 | 3.24 |
| gcc | 92.88 | 1.19 | 93.97 | 0.74 | 1.17 |
| vortex | 3.80 | 0.01 | 3.91 | 0.01 | 2.89 |
| pyramid | 0.99 | 0.01 | 1.02 | 0.01 | 3.03 |
| gzip | 2.78 | 0.03 | 2.82 | 0.03 | 1.01 |
| Average | | | | | 1.78 |

FIG. 8

SYSTEM AND METHOD FOR ENFORCING APPLICATION SECURITY POLICIES USING AUTHENTICATED SYSTEM CALLS

TECHNICAL FIELD

This disclosure generally relates to data processing, and in particular it relates to software upgrading.

BACKGROUND OF THE DISCLOSURE

Outside attacks that attempt to compromise a computer system are an increasingly common and important threat. Computer programs and applications on such compromised systems can generally only be used to cause real damage by exploiting system calls, making the system call interface the ideal point to detect and control various types of attacks. Consequently, system call monitoring has been a widely used technique for detecting and quarantining compromised applications, in an effort to minimize any damage that could be caused.

Prior system call monitoring approaches have been based on developing a model, or policy, of an application's normal system call behavior, and then halting execution when an application deviates from its modeled behavior. Policy checking and enforcement are security-critical. Hence, in prior systems, such functions are performed entirely within the operating system kernel, or within the operating system kernel and in conjunction with a separate, protected policy server (daemon). Both such approaches require large-scale changes to the kernel. In addition, the former can have unacceptably high execution costs, while the latter can result in a substantially more complex kernel, which then has further associated increases in execution overhead.

Accordingly, there is a need for a system and method for enforcing application security policies that addresses certain problems of existing technologies.

SUMMARY OF THE DISCLOSURE

The present disclosure, therefore, introduces a system and method for enforcing application security policies using authenticated system calls as a more efficient technique for monitoring and enforcing system call policies. An authenticated system call is similar to an original or existing system call of an application, but includes additional arguments that specify a policy that the system call should satisfy, and a message authentication code (MAC) that guarantees the integrity of the policy as well as other arguments to the system call. Since the policy and MAC are typically provided to an untrusted application, the MAC is computed with a cryptographic key that is available only to the kernel. At each invocation of an authenticated system call, the kernel uses the key to re-compute the MAC, and only allows the call to proceed if this matches the MAC passed by the application. Since the application never has access to the key, it cannot successfully create a new authenticated system call or tamper with an existing authenticated system call, thereby denying attacks which attempt to do the same. The approach of dividing functionalities between the application and the kernel in these manners has not heretofore been described or suggested for policy enforcement using authenticated system calls.

In various embodiments, automatic transformation of the application is applied to replace each system call with a corresponding authenticated call. This is done by a trusted installer program that may, for example, read the application binary of application system calls, use static analysis to determine an appropriate policy for each such call, and then rewrite the original application binary with binary code comprising corresponding authenticated system calls. The use of static analysis of various embodiments has significant advantages over methods based on hand-written policies or policies obtained by training, i.e., recording the system call behavior of the application over a period of time. In particular, the analysis and replacement of system calls in these manners are completely automatic, and quickly produce useful policies for all system calls, including those invoked by rarely-used parts of an application.

BRIEF DESCRIPTION OF THE DRAWINGS

Further aspects of the present disclosure will be more readily appreciated upon review of the detailed description of its various embodiments, described below, when taken in conjunction with the accompanying drawings, of which:

FIG. 3 is a table displaying a number of system calls typically found in the policies of different programs;

FIG. 4 is a table displaying a comparison of policies for a bison program;

FIG. 7 is a table displaying benchmark descriptions for a number of programs;

FIG. 8 is a table displaying processing overhead using authenticated system calls.

DETAILED DESCRIPTION OF THE SPECIFIC EMBODIMENTS

Referring now to FIGS. 1-9, wherein similar components of the present disclosure are referenced in like manner, various embodiments of a method and system for enforcing application security policies using authenticated system calls will now be described in more detail.

System call monitoring has been a known technique for detecting and controlling compromised applications by checking at runtime that various original system calls conform to a policy that specifies the program's normal behavior. This disclosure introduces a new approach to system call monitoring based on authenticated system calls. An authenticated system call is a system call augmented with extra arguments that specify the policy for that call and a cryptographic message authentication code (MAC) that guarantees the integrity of the policy and the system call arguments. This extra information is used by the operating system kernel to verify the system call. The version of the application in which regular system calls have been replaced by authenticated calls is generated automatically by a trusted installer program that reads the application binary, uses static analysis to generate policies, and then rewrites the binary with the authenticated calls.

This approach makes it harder for hackers and/or malicious software to get access to, and control of, computers without authorization. It ensures that if a program or application has been compromised (e.g., through a successful buffer overflow attack), the compromised program is prevented from performing actions not permitted by the program's security policy. The security policy is based on the program's normal behavior. Furthermore, this approach prevents an attacker or malicious software from installing and running new applications or daemons on a compromised machine.

The approach provides an efficient method for system call monitoring without requiring the operating system kernel to maintain state (e.g., application security policy) for each application program, and without requiring use of additional application space trusted daemons for policy checking. Both of these alternative approaches have their security threats and performance implications. For example, the disclosed approach only requires the kernel to perform a simple MAC check to verify a system call. This approach has low runtime overhead (approximately 2% additional usage), and is highly effective in the prevention of various types of security attacks, as described in detail later below.

Figure 1:
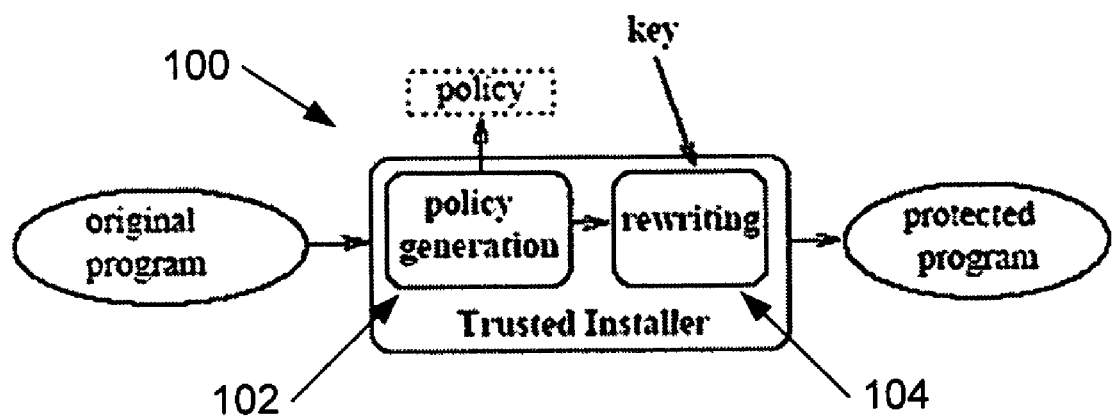
FIG. 1 depicts an exemplary block diagram of a trusted installer according to various embodiments of the present disclosure.

As noted above, there are two steps needed to protect systems using the systems and methods disclosed herein, namely, (i) installing authenticated system calls to replace the original system calls of an application, and (ii) runtime checking by the kernel to ensure that each and every system call matches its policy. An exemplary trusted installer program 100 is illustrated in FIG. 1. First, the binary of an application and its system calls is read by a trusted installer program, which then generates a policy according to a policy module 102. The policy captures the allowed behavior for each system call by using, for example, static analysis, and then a rewriting module 104 rewrites the binary as an authenticated system call, such that each system call includes the policy and a cryptographic MAC that protects the policy. The key for the MAC is also specified during the installation process.

Figure 2:
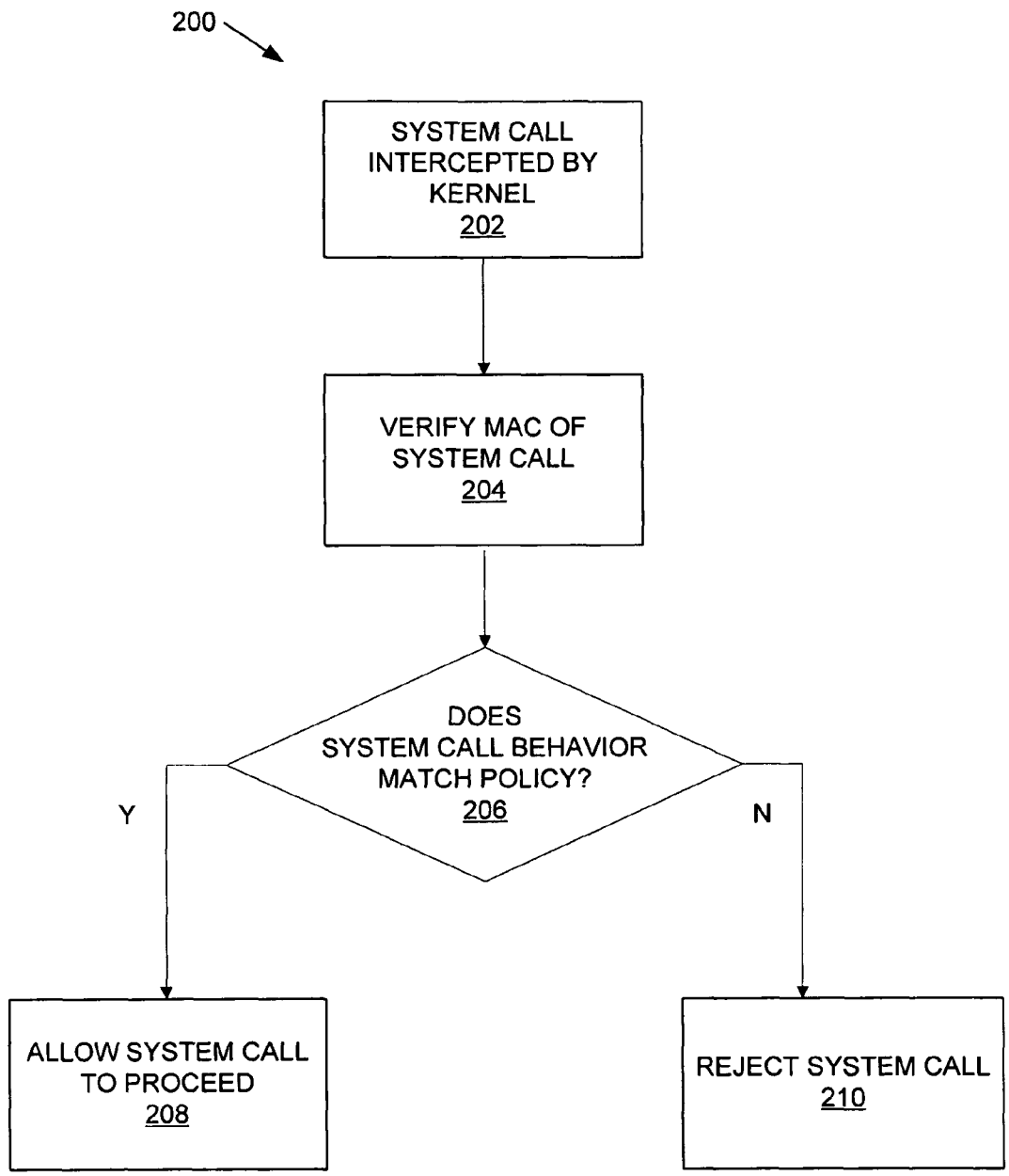
FIG. 2 depicts an exemplary system call checking method, performed by the trusted installer program of FIG. 1.

A system call (syscall) checking method 200 performed by the trusted installer 100 is further illustrated in FIG. 2. At runtime, each system call is intercepted by the kernel (step 202) and, when the MAC is verified (step 204) using the same key as used during installation, the behavior of the call is next verified against the policy (step 206). If the MAC is verified and the behavior matches the policy, the call is allowed (step 208), otherwise, the call is rejected (step 210) and the syscall checking method 200 is terminated.

A policy can be a set of verifiable properties of a system call request. One exemplary system call policy may be of the following form:
  Permit open from location 0x806c462
  Parameter 0 equals "/dev/console"
  Parameter 1 equals 5
This policy allows an application to invoke an open system call from a call site at memory address 0x806c462, provided that the first parameter is a pointer to the string "/dev/console," and the second parameter is the constant 5. In general, such policies could, in addition, specify a system call number, the call site, constant parameter values (e.g., integer constants), and constant parameter addresses in an un-modifiable data segment (e.g., strings). If a policy does not give a value for a parameter, then the parameter may unconstrained and any value may be allowed.

These policies may be more complex than prior system call policies for existing system call monitoring systems, such as SYSTRACE, which typically constrain only the system call number, constant parameter values and addresses. Various embodiments of the present disclosure, on the other hand, extend policies to include, for example, policies derived from call graphs, policies that allow argument values to match patterns, and capability tracking policies for arguments such as file handles, all of which are described in detail later below.

The trusted installer program is used by a system administrator to generate the policy for an application, and to produce an executable binary that contains authenticated system calls. This program, which is an advance on the Pentium Link Time Optimizer (PLTO) BINARY REWRITING SYSTEM (described in B. Schwarz, S. K. Debray, and G. R. Andrews, "PLTO: A link-time optimizer for the Intel IA-32 architecture," Proc. 2001 Workshop on Binary Translation (2001), the entirety of which is hereby incorporated by reference), reads in an application binary, disassembles it, and constructs a control flow graph that includes all the system calls in the application. Additional static analysis techniques, such as constant propagation, and the like, are used to try to determine the values of the system call arguments. This results in a policy for each system call consisting of the system call number, call site, and some argument values. Such policies may be refer to as the system call's authenticated system call (ASC) policy, while the combination of ASC policies for all system calls in an application make up the application's ASC policy. Once an application's policy has been generated in this way, it can be printed out for the administrator to review, or the installer can proceed directly to the rewriting process.

In the rewriting step, the installer transforms the binary by replacing the original system calls with authenticated system calls. An authenticated system call consists of the original system call extended by two arguments: a policy descriptor and the MAC, as described previously above. The policy descriptor may be a single 32-bit integer value that describes what parts of the system call are protected by the MAC. In particular, for each original argument of the system call, it encodes whether the argument is unconstrained or constrained to be a constant value or address. The installer computes the MAC over the encoded policy, such as a byte string that is a self-contained representation of the policy. It builds this encoded policy by concatenating two or more of the system call number, the address of the call site, the policy descriptor, and the argument values for those arguments that are constrained.

For example, for an exemplary policy:
  Permit fcntl from location 0x806c57b
  Parameter 1 equals value 2
the installer may compute the byte string:
  005c 00000011 0806c57b 0000002
Here, "005c" is the system call number of fcntl, and "00000011" is a 32-bit number that says that the call site and parameter 1 should be constrained and parameter 0 should be unconstrained, "0806c5b7" is the call site, and "00000002" is the value for parameter 1. The installer computes a MAC over this byte string using a key provided by the system administrator. For example, the known AES-CBC-OMAC message authentication may be used, which produces a 128-bit code. The installer adds the MAC to the data segment of the binary, and adds a pointer to the MAC as an argument to the system call. The result, in this instance, is an authenticated system call with two more arguments than the original system call.

The trusted installer completes once it has processed each and every system call in the program, and the system as a whole is protected once all binaries that run in a user space have been transformed to use authenticated system calls by the trusted installer.

Enforcement of an application's ASC policy is done by the kernel at runtime. When an authenticated system call occurs, the kernel receives arguments that include the system call number, the arguments to the original unmodified call, the policy descriptor, and the MAC. Furthermore, it can determine the call site based on the return address of the kernel interrupt handler. Using this information, the kernel performs the following computation to validate that the actual system call complies with the specified policy. It first constructs an encoding of the system call by concatenating the system call number, the call site, the policy descriptor, and those argument values that are specified in the policy descriptor. The kernel then computes a MAC over this encoding of the system call using the same key used during installation, and checks that the result matches the MAC passed in as an argument. If the MACs match, the kernel carries out the system call. Otherwise, it terminates the process, logs the system call, and alerts the administrator. Unauthenticated calls are also blocked.

Syscall checking is designed so that MAC matching fails if an application has been compromised. Note that the arguments to the authenticated system call are under the control of the application, which means that a compromised application could tampered with the policy descriptor and MAC, or could attempt to construct a new authenticated system call somewhere in the heap. However, any change to the system call number, call site, policy descriptor, or values of arguments constrained by the policy would result in a change to the encoding of the system call that is constructed by the kernel. This, in turn, would change the MAC needed to pass the kernel test. However, it is nearly always infeasible for an attacker to construct a matching MAC without access to the key used by the kernel. Hence, any attempt by the application to change the system call to violate the policy will fail.

One implementation of the trusted installer may be based on the PLTO binary rewriting system, as described above. The installer could therefore run on LINUX, PLTO's native platform. The policy generation portion of the installer in this form may also ported to OPENBSD to compare policies generated on the two platforms.

PLTO is fundamentally an optimization tool and, as a result, it requires relocatable binaries (i.e., binaries in which the locations of addresses are marked), so that addresses can be adjusted as code transformations move data and code locations. Various embodiments of the present disclosure may incorporate this requirement, although policies for binaries may be generated without relocation information. One impact of this restriction is that the binaries must be compiled from a source, since binaries shipped with standard LINUX and UNIX distributions do not contain relocation information.

Syscall checking has been implemented in LINUX by adding a little over 200 lines of code to the kernel's software trap handler, and including a cryptographic library of about 3000 lines of code for MAC functionality. The software trap handler is responsible for identifying the system call number and arguments, invoking the appropriate system call handler, and returning the result to the calling application. Standard handlers have been modified to call a routine that uses the MAC to verify that the system call satisfies the required policy.

The ideal policy for an application would permit the system call behaviors needed for normal operation and no others. On the one hand, if the policy permits system calls not used by the uncompromised application (unneeded calls), it leaves open the possibility that such calls could be exploited by an attacker. On the other hand, if the policy omits some system calls actually used by the application (needed calls), it raises the possibility of a false alarm that causes the application to be terminated unnecessarily. False alarms are a significant administrative headache and barrier to use, and thus are to be avoided.

Various embodiments of the present disclosure replace all needed calls since ASC policies are generated using conservative static analysis, so it avoids false alarms. In contrast, policies generated by hand or by training may miss needed system calls, for example, because they occur only in parts of the program that are rarely executed.

ASC policies might include unneeded system calls, because no static analysis is able to identify the exact set of needed calls for every program. Note, however, that unneeded calls might also appear in policies produced by hand or by training. Hand produced policies can include mistakes, for example. System calls identified through training are never unneeded by definition, but there are still opportunities for errors. For example, policies might be obtained by training on one version of an application and operating system, and used on another. In general, policies generated by training are not portable between operating systems, or even between different versions of the same operating system, and they may need to be adjusted even when only libraries are updated.

In order to gather some empirical evidence regarding false alarms, unneeded system calls, and operating system effects, the policy generator used in various embodiments herein was ported from LINUX to OPENBSD, as noted above. OPENBSD is a useful test case because it supports a system call monitor, SYSTRACE, in its default build, and others have published many SYSTRACE policies for OPENBSD applications. The SYSTRACE policies are generated through training along with hand edits, so their availability provides a useful benchmark against which to compare automatically generated ASC policies.

The table 300 of FIG. 3 compares the number of distinct system calls permitted in both ASC and SYSTRACE policies for several common UNIX programs: bison, the GNU Project parser generator; calc (an arbitrary-precision calculator program), and screen (a screen manager with terminal emulation). The first column of the table 300 gives the numbers for the ASC policy generated on LINUX, the second column the ASC policy generated on OPENBSD, and the third column gives the numbers for SYSTRACE policies published by the PROJECT HAIRY EYEBALL web site. This table 300 demonstrates that there are significant differences in the system calls needed for the same application running on different operating systems, which in turn, implies that policies for one operating system cannot simply be used on another. The results in table 300 also illustrate that ASC policies identify system calls that are not present in SYSTRACE policies.

The table 400 of FIG. 4 examines the policies for bison in more detail. The table 400 shows system calls that are permitted by the ASC policy generated on OPENBSD, but not by the SYSTRACE policy, and vice versa. Note that the ASC policy includes many system calls that are not present in the SYSTRACE policy. It is believed that most of these calls are in fact needed, and some of them have been verified by hand using a system call tracer on actual runs of various applications. This means that the SYSTRACE policy can cause false alarms.

Conversely, there are a few system calls permitted by the SYSTRACE policies that are not allowed in the ASC policy. They break down as follows:

"mmap." The mmap system call is implemented on OPENBSD by invoking syscall, a generic indirect system call function. The ASC policy correctly constrains the arguments of syscall so that only mmap can be invoked, however. With SYSTRACE, this indirection is hidden from users since its policy does not explicitly allow syscall.

"close." The call of close is not identified by PLTO due to an unusual implementation on OPENBSD that PLTO currently cannot disassemble. However, PLTO always reports when it cannot completely disassemble a binary, so that the system administrator would always be aware of such a problem. To date, similar difficulties have not been experienced with LINUX, PLTO's native platform.

"mkdir," "readlink," "rmdir," "unlink." The file system operations are specified in SYSTRACE policies using two generic names, fsread and fswrite, each of which denotes any read or write-related system call, respectively. The fact that mkdir, etc. are not in the ASC policy indicates that they are unneeded system calls, but their execution would be allowed with SYSTRACE since its policy includes fsread and fswrite.

The second issue in evaluating ASC policies is determining the degree to which each system call is protected from alteration by the MAC. In various implementations of authenticated system call generation herein, the system call site and call number are always protected by the MAC, as are those arguments whose values can be determined by static analysis. It is, of course, impossible to determine all argument values using such techniques; for example, the value may be read as a user input, generated as a result of a system call, or may be unknown because of the use of things such as pointer aliasing. However, static analysis can determine enough values to be useful in practice. In addition, it can provide a partially filled policy template that can then be extended by the system administrator using dynamic profiling and application knowledge, as described below and depicted in FIG. 9.

Figure 5:
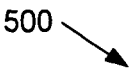
FIG. 5 is a table displaying argument coverage for a number of programs.

The table 500 of FIG. 5 provides the results of generating ASC policies for four programs: the three from above and tar, a UNIX archiving program. The "sites" column indicates the number of separate system call locations in the program, "calls" indicates the number of different system calls, and "arguments" gives the total number of arguments (not including the system call number) from all the call sites. The "output" column gives the number of system call arguments that are output only arguments. That is, the argument is an address of a structure where the kernel stores the result of the call. The "protected" column lists the number of arguments that could be determined by the static analysis done by the installer and that could be protected by the basic approach. These results indicated that 30-40% of the arguments can be protected based on static analysis and the basic approach.

In addition to these arguments, there are many others that might be protected by using extensions such as those described herein. The table 500 includes statistics for two of these as well: arguments where the argument value can be determined using static analysis, but each argument may have two or more values (disjunction); and arguments that are file descriptors that were returned previously as a result of system calls such as open or socket (fds).

Figure 6:
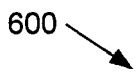
FIG. 6 is a table displaying the effect of authentication on individual system calls.

The performance overhead introduced by the syscall checking mechanism will now be described in more detail. The table 600 of FIG. 6 presents the overheads introduced by the techniques described herein on a per system call basis. These results were obtained by executing each system call 10,000 times using a loop, and measuring the total number of central processing unit (CPU) cycles using the Pentium processor's rdtsc instruction, which reads a 64-bit hardware cycle counter. The last two rows of the table 600 indicate the overhead of the measurement process itself. Each experiment was repeated 12 times. The highest and lowest readings were discarded and the average of the remaining 10 readings are displayed in the table 600. The "original cost" gives the number of cycles required to execute an unmodified system call on an unmodified kernel, while the "authenticated cost" and "authenticated overhead" columns show the respective effects of authenticated system calls.

The results displayed in the table 600 indicate a noticeable cost for the checking mechanism, namely about 4000 cycles for each call. As might be expected, however, on a percentage basis, the overhead is much more significant for simple system calls, such as getpid and gettimeofday, than for more complex calls like write, where the costs associated with buffering and memory accesses dominate.

To measure the effect of these techniques on the overall performance of applications, the running times of ten programs were compared to their protected counterparts, the results of which are displayed in the table 700 of FIG. 7. The programs therein can be classified as either CPU or system call intensive, as shown in the table 700. The CPU-intensive programs are from the SPECint-2000 benchmark suite, while the system call intensive programs are a collection of common applications that incur a large number of system calls. The programs were compiled using GCC 3.2.2, with additional flags to create statically-linked relocatables that were then processed using our binary rewriting system, PLTO. Two types of executables were created: untransformed binaries corresponding to the unmodified program and authenticated binaries that use authenticated system calls. Untransformed binaries generated by PLTO were used rather than simply GCC 3.2.2 as the baseline, since PLTO itself applies certain optimizations such as dead code elimination, basic block layout, and instruction scheduling. As a result, applying these optimizations in both cases gives the most accurate representation of the actual cost of an authenticated call. The cost of actually transforming the programs ranged from 3.19 seconds for mcf to 85.37 seconds for GCC 3.2.2.

To determine the above, the time taken for each program to execute on a fixed set of inputs was measured. The 'time' utility was used to measure the time taken by each program, with the total computed as the sum of the user and system time. As before, each experiment was repeated twelve times. The highest and lowest readings were discarded, and the average of the remaining ten readings is used in the table. The results, reported in the table 800 of FIG. 8, indicate a modest overhead ranging from 0.06% to 3.24%.

The effect of the authentication mechanism on a multi-program benchmark was also studied in detail. The benchmark performed was similar to the Andrew Benchmark and consists of a series of tasks that perform routine operations such as file creation, directory creation, file compression, file archival, permission checking, moving files, deleting files, and sorting the content of files. Each iteration of the benchmark results in the invocation of about 12,000 system calls. Authenticated versions of several general purpose tools such as gzip, gunzip, rm, chdir, mv, chmod, tar, cat, and cp were used to perform the tasks. The execution time of the benchmark using original binaries was 258.68 seconds, while the execution time for authenticated binaries was 261.50 seconds, an increase of only 1.09%.

Different techniques for improving the expressiveness of policies to allow, for example, more complete argument coverage were also explored.

An ASC meta-policy is a specification that dictates how strict a policy is required for each system call. In particular, for each system call, the meta-policy indicates whether the call site must be specified in the policy and which arguments of the system call must be constrained. Compared with the approaches above, meta-policies focus on what must be protected for a system call rather than what can be protected automatically based on static analysis. Meta-policies would typically be derived from the threat level of different system calls and local administrative policies.

Figure 9:
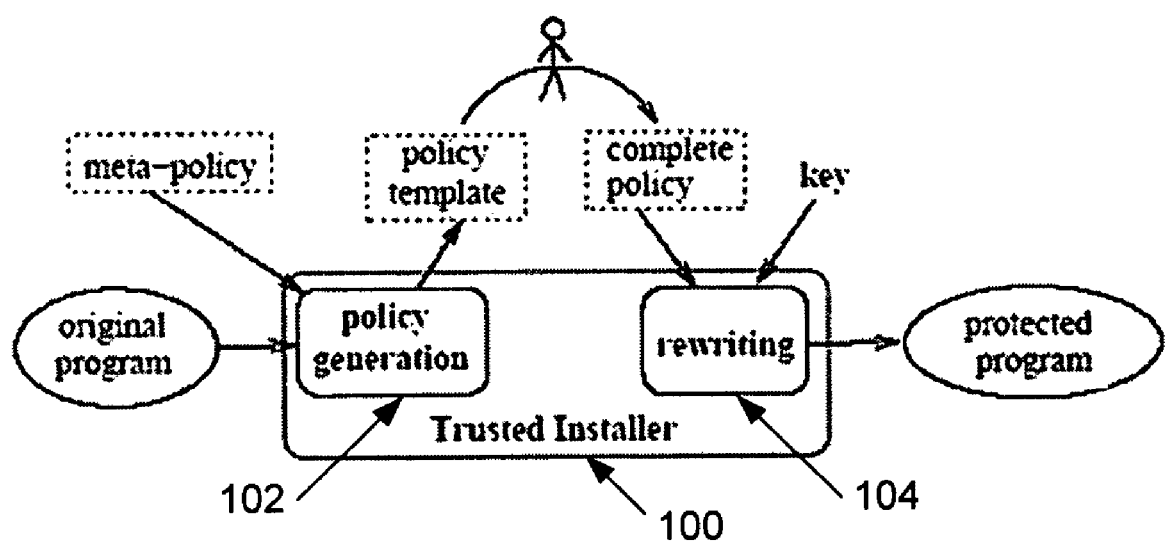
FIG. 9 is a diagram of an exemplary trusted installer that accepts further inputs and operates in conjunction with a human operator, according to certain embodiments of the present disclosure.

In a refinement of the trusted installer program shown in FIG. 1, a meta-policy may be given as input to the trusted installer 100 along with the original program, as shown in FIG. 9. If the policy generator cannot determine all the argument values required by the meta-policy based on static analysis, it generates a policy template with spaces for the additional required arguments. An administrator can then either specify an absolute value based on application knowledge or dynamic profiling, for example, or if the absolute value is not known, a pattern (e.g., "/home/smith/www/*") can be used. The result of this is the complete ASC policy, which is then used during the rewriting phase by the installer.

Patterns in meta-policies are implemented by having the installer store the patterns in the program address space. For each system call, the policy descriptor argument is extended to contain an index to the appropriate pattern in the structure. The MAC then is calculated over the required patterns in addition to the fields used in the basic approach. The kernel can then check the MAC to verify that the policy and the patterns have not been modified, and then use normal pattern matching routines to match the argument runtime value against the pattern. Program checking techniques might be used to do the pattern matching in the untrusted application, with a quick verification by the kernel.

Meta-policies also play a role in extending the authenticated system call approach to address the issue of dynamic libraries mentioned above. Dynamic libraries are different from statically-linked binaries because call sites for invocations within a function in the dynamic library—to system calls in this case—are not known until the library is loaded at runtime. This means that various embodiments of the disclosed authenticated system call generation processes above may not protect the call site from alteration using the MAC, as done with statically-linked binaries. In addition, arguments used by system calls in dynamic libraries are often passed as arguments to the function, meaning that their values cannot be determined by static analysis.

Dynamic libraries are processed based on the security requirements stated in the meta-policy as follows. The dynamic libraries on a machine are installed first before the application programs. During this process, if a system call in a dynamic library function cannot satisfy the meta-policy, that is, static analysis cannot generate a complete policy, the specific function is removed from the dynamic library and set aside for static linking with application programs that require the function. Once this has been done for all system calls in the library, the functions that remain have their system calls transformed into authenticated calls in the same manner as before. Functions in this new protected dynamic library can then be loaded at runtime. Note that since a single meta-policy is used for the installation of each dynamic library, it must be something that is appropriate for all applications that use that library.

Another useful feature is to allow policies that rely on state of some sort. For example, one might want a policy that requires that each call to open must be followed by a close before open can be called again. Here, the state would be a boolean indicating whether open is allowed. The state variable would be checked and modified by the syscall checker when an open is called, and modified again when close is called.

An obvious way to support policy state is to store the state in the kernel. However, one of the virtues of authenticated system calls is that they require minimal change to the kernel, something that would be lost if the state is large or has a complex structure. Therefore, it would be preferable to keep any policy state in the application itself, with only the updates and maintenance being done by the kernel. This can be achieved using the idea of on-line memory checkers, where a data structure is stored in unreliable memory, and a trusted checker with a small amount of reliable memory verifies the correctness of each update as it occurs. Assuming that some per-process state in the form of a byte string is required to implement policy state, then the basic authenticated system call approach may be modified as follows. First, the kernel is modified to maintain a single counter variable for each process, initialized to 0 and stored in kernel space. Then, the installer is changed to add one variable to the data segment of each application to hold the policy state (the byte string), and a second variable to hold a MAC for the state. The state variable is initialized as needed by the policy, and the state MAC is calculated over the initial state and the initial application counter value, O. Pointers to the policy state and state MAC are then passed as additional arguments in each authenticated system call.

At syscall checking time, if the policy for the system call depends on the policy state, the kernel recomputes the state MAC using the application counter and the policy state passed in the call. If the recomputed MAC matches the state MAC passed in by the application, the call is allowed to proceed; otherwise, the application is terminated. If the policy requires changing the policy state, the kernel increments the application's state counter and calculates a new state MAC over the new counter value and policy state. The new state MAC is stored over the previous state MAC in application space. It is computationally infeasible for an adversary to compute a valid MAC for some desired policy state and state counter and the kernel-space state counter prevents the adversary from re-using state MACs computed by the kernel for previous states.

A simple but useful example of a policy requiring state is one based on the application's call graph. Such a policy could, for example, require that the application's system call trace be a path in the call graph, providing further protection against compromised applications. In policies of this type, static analysis is used to construct a conservative approximation of the call graph, which is then encoded as a finite automaton for syscall checking.

Policies of this type are easily implemented with authenticated system calls. The installer already computes the call graph of the system calls of an application. Given this call graph, one can label each node of the call graph by its call site. The policy state becomes the call site of the last node executed by the application. The policy of each system call is then extended to say that the policy state must be one of the predecessors of the system call in the static call graph. Syscall checking in the kernel is extended to verify that the previous call site is in the list of predecessors given in the policy, and to update the policy state to the new call site.

As was the case with the general issue of state-based policies, some of the work can be moved from the kernel to the application to minimize the impact on the kernel. For example, we could force the application to calculate the predecessor of the node from the list of possibilities, and pass this in to the kernel to verify.

Another useful feature for policies is the ability to specify that an argument to a system call be based on arguments or return values of previous system calls. An example would be a policy for a read system call that requires that the file descriptor argument be a value returned by a previous open system call. Policies of this type are referenced as capability tracking policies, since such arguments are being used in a manner analogous to capabilities. The authenticated system call approaches described above can be extended to support this feature using the example of tracking file descriptors.

One implementation of file descriptor tracking would use policy state to store the last file descriptor returned by each call to open. The policy for each read system call would specify that the file descriptor should match the file descriptor for the desired open system call. However, this ignores the fact that an open system call can be executed more than once, that more than one file descriptor returned by the open can be active at once, and that file descriptors can be reused after they have been closed.

A superior approach would to store, for each open system call, a set of currently active file descriptors. The policy for each open then adds a file descriptor to the set, while the policy for close removes a file descriptor. This involves fairly complicated data structures, so it may not use the simple policy state implementation described above, but rather a more efficient implementation based, for example, on authenticated dictionaries.

A recurring problem for system call monitors has been dealing with race conditions caused by features such as symbolic links and relative file names. For example, consider a policy that allows an application to open a temporary file, /tmp/foo. An attacker could try to exploit this by creating a symbolic link named /tmp/foo that points to /etc/passwd, and then overwriting the password file by opening and writing /tmp/foo.

To avoid this, system call monitors often use the convention that a file name in a policy must refer to the normalized file name, that is, the name of the file after all symbolic links have been followed. While doing normalization correctly can be complex, strategies developed elsewhere for performing this step in the kernel during syscall checking apply to the various embodiments described herein. In addition, it is possible to move some of the processing into the untrusted application, using techniques similar to those described above for state-dependent policies.

An application may become compromised, for example, through a buffer overflow, giving an attacker control of the application process. In such an instance, the application would not be able to execute arbitrary system calls, but it could execute any authenticated system calls in the application, provided it did not change the call site and parameters covered by the policy. This can lead to mimicry attacks, which are well known and which can be defended against by using more precise policies.

Various implementations of the present disclosure may be vulnerable to a similar, but more subtle attack: the compromised application could execute authenticated system calls that it finds in other applications on the system. Once the attacker has control of an application, it might use it to examine the other applications on the system, and construct and execute a new application composed of authenticated system calls from many applications. This is generally known as a Frankenstein attack.

A simple variation on call graph policies can defend against Frankenstein attacks. Recall that a call graph policy requires an application to execute system calls in an order consistent with its static call graph. The call graph of an application is self-contained, so if a call graph policy is imposed on all of the applications, a Frankenstein program would be forced into executing only the system calls of a single application, namely, the application that supplies the first authenticated system call executed by the Frankenstein program. In such case, one needs only to take care that the installer uses distinct labels for the nodes of all the application programs.

System call monitoring falls into the broader area of intrusion detection systems. An intrusion detection system can try to detect misuse (known attacks) or anomalies (deviation from normal behavior). Misuse detectors can be vulnerable to previously unknown attacks, while anomaly detectors can suffer from false alarms. The processes disclosed herein form an anomaly detector that avoids false alarms because of static analysis. System call monitoring can be implemented entirely in user space, but typically this is not secure against attacks such as buffer overflows, so this is not appropriate for our setting. User-space implementations can be secure for applications written in a safe language such as JAVA. However, most systems have focused on applications written in unsafe languages, so they are implemented entirely in the kernel or by using kernel hooks or patches in combination with a user-space policy daemon or monitor.

The implementations herein, on the other hand, use a kernel modification in combination with binary modifications to the untrusted user application itself, and do not rely on a separate policy daemon. Instead, cryptographic techniques and program checking techniques are employed to ensure that any work done by the untrusted application regarding policy decisions is done correctly.

In comparison to systems implemented entirely in-kernel, the kernel modifications described herein are minor, on the order of a couple of hundred lines of code, compared to thousands with other systems. A completely-in-kernel implementation must maintain the policies and the logic for determining which policy applies to a given call. In the implementations herein, these burdens are placed on the application. Note in particular that the exact policy for a given authenticated system call is provided by the call itself. This provides an advantage in speed and simplicity.

In comparison to systems implemented with user-space policy daemons, the processes disclosed herein have the advantage of fewer context switches, leading to a very modest overhead. Avoiding a separate monitor process simplifies policy checking, because the operating environment (current working directory, etc.) does not have to be mirrored, and some race conditions are avoided.

Various additional modifications to the processes described above can be made by those of ordinary skill in the art without departing from the scope of the present disclosure. For example, policies for most system call monitors may be developed by hand or by training. In addition, the steps of rewriting binary code to replace normal system calls with authenticated system calls could also be done by a compiler.

Although various methodologies have been particularly described in the foregoing disclosure, it is to be understood that such descriptions have been provided for purposes of illustration only, and that other equivalents and variations, both in form and in detail, can be readily employed by those of ordinary skill in the art without departing from the spirit and scope thereof, as defined first and foremost by the appended claims.

What is claimed is:

1. A method for securing a computer system, comprising:
identifying an original system call used by an application;
generating an authenticated system call corresponding to the original system call using a key stored at an operating system kernel level, the authenticated system call including a message authentication code component comprising a code encrypted by the key and a policy component based upon the original system call;

replacing, via a processor, the original system call with the authenticated system call by re-writing the binary code of the application;

receiving the authenticated system call from the application, the authenticated system call having the message authentication code component;

decrypting the message authentication code component using the key to determine a received code; and verifying the authenticated system call by comparing the received code to the code encrypted by the key.

2. The method of claim 1, wherein the policy component comprises a call graph policy.

3. The method of claim 1, wherein the policy component comprises a policy that allows argument values of the system call to match patterns.

4. The method of claim 1, wherein the policy component comprises a capability tracking policy.

5. The method of claim 1, comprising:

determining a behavior for the original system call, wherein the determining comprises:

using static analysis to generate a model of accepted behavior of the application; and determining a policy for the original system call of the application based on the model.

6. The method of claim 1, further comprising:

accepting the authenticated system call when the code matches the message authentication code component encrypted by the key.

7. The method of claim 1, further comprising:

rejecting the authenticated system call when the code does not match the message authentication code component encrypted by the key.

* * * * *